(12) United States Patent
Galgali et al.

(10) Patent No.: US 12,281,218 B2
(45) Date of Patent: *Apr. 22, 2025

(54) REDUCTION IN VOC AND FOG VALUES OF POLYPROPYLENE GRADES BY AERATION

(71) Applicant: BOREALIS AG, Vienna (AT)

(72) Inventors: Girish Suresh Galgali, Linz (AT); Luca Boragno, Linz (AT); Andreas Fuchs, Linz (AT); Jürgen Huber, Linz (AT); Stefanie Engleder, Linz (AT)

(73) Assignee: BOREALIS AG, Vienna (AT)

( * ) Notice: Subject to any disclaimer, the term of this patent is extended or adjusted under 35 U.S.C. 154(b) by 844 days.

This patent is subject to a terminal disclaimer.

(21) Appl. No.: 17/289,629

(22) PCT Filed: Oct. 30, 2019

(86) PCT No.: PCT/EP2019/079690
§ 371 (c)(1),
(2) Date: Apr. 28, 2021

(87) PCT Pub. No.: WO2020/089308
PCT Pub. Date: May 7, 2020

(65) Prior Publication Data
US 2021/0395504 A1    Dec. 23, 2021

(30) Foreign Application Priority Data

Oct. 31, 2018    (EP) .................... 18203757

(51) Int. Cl.
| | | |
|---|---|---|
| *C08L 23/14* | (2006.01) | |
| *B01D 19/00* | (2006.01) | |
| *C08F 6/00* | (2006.01) | |
| *C08L 23/16* | (2006.01) | |
| *B29B 9/16* | (2006.01) | |

(52) U.S. Cl.
CPC .......... *C08L 23/14* (2013.01); *B01D 19/0005* (2013.01); *C08F 6/005* (2013.01); *C08L 23/16* (2013.01); *B29B 2009/168* (2013.01); *C08L 2205/025* (2013.01); *C08L 2205/035* (2013.01); *C08L 2207/062* (2013.01)

(58) Field of Classification Search
CPC .... C08L 23/14; C08L 23/16; C08L 2207/062; C08L 3/12; C08L 23/12; B29B 2009/168; C08F 6/005
See application file for complete search history.

(56) References Cited

U.S. PATENT DOCUMENTS

| | | | | |
|---|---|---|---|---|
| 4,332,933 A * | 6/1982 | Di Drusco | ................ | C08F 6/02 528/499 |
| 4,372,758 A * | 2/1983 | Bobst | ...................... | C08F 6/005 528/483 |
| 6,218,504 B1 * | 4/2001 | Dolle | ...................... | B29B 13/00 528/503 |
| 2004/0132964 A1 * | 7/2004 | Mulgrew | .................. | B29B 7/82 528/481 |
| 2006/0217528 A1 * | 9/2006 | Cousin | ...................... | B29B 9/16 528/480 |
| 2010/0249329 A1 * | 9/2010 | Grein | ......................... | C08J 5/18 525/240 |
| 2012/0003478 A1 * | 1/2012 | Matsumura | ................ | C08J 3/12 525/240 |
| 2016/0272741 A1 * | 9/2016 | Wang | ..................... | C08F 110/06 |
| 2017/0121432 A1 | 5/2017 | Salek et al. | | |
| 2018/0200921 A1 * | 7/2018 | Grein | ........................ | B29B 9/12 |
| 2021/0403677 A1 * | 12/2021 | Fuchs | ....................... | C08K 3/40 |
| 2024/0043657 A1 * | 2/2024 | Fuchs | ....................... | C08K 3/34 |

FOREIGN PATENT DOCUMENTS

| | | |
|---|---|---|
| CN | 101084094 A | 12/2007 |
| EP | 1671773 A1 | 6/2006 |
| EP | 1988122 | 11/2008 |
| EP | 2108679 A1 | 10/2009 |
| EP | 2154190 A1 | 2/2010 |
| EP | 2262858 B1 | 2/2013 |
| EP | 3124537 A1 | 2/2017 |
| EP | 3126408 B1 | 10/2017 |
| EP | 3260489 A1 | 12/2017 |
| GB | 1272778 A | 5/1972 |
| WO | 2002/088194 A1 | 11/2002 |
| WO | 2004/039848 A1 | 5/2004 |
| WO | 2006/067146 A1 | 6/2006 |
| WO | 2014/090856 A1 | 6/2014 |
| WO | 2017/079246 A1 | 5/2017 |

OTHER PUBLICATIONS

PipeFlow Steam at boiling point properties flyer (Year: NA) (Year: NA).*
Air-Dynamic and Kinematic Viscosity flyer (Year: NA) (Year: NA).*
Air Properties flyer flyer (Year: NA) (Year: NA).*
WO 2017-012891 (Year: 2018).*
Applicant: Borealis AG; "Reduction in VOC and FOG Values of Polypropylene Grades by Aeration"; European Patent Application No. EP18203757; Extended European Search Report; Apr. 11, 2019; 15 pgs.
Applicant: Borealis AG; "Reduction in VOC and FOG Values of Polypropylene Grades by Aeration"; Chinese Patent Application No. 201980071567.9; Chinese Office Action; dated Jan. 20, 2023; 22 pgs.

* cited by examiner

*Primary Examiner* — Irina Krylova
(74) *Attorney, Agent, or Firm* — Tarolli, Sundheim, Covell & Tummino LLP

(57) ABSTRACT

A process for reducing the amount of volatile and semi-volatile organic substances of a polypropylene composition to below 150 μg/g (VOC, VDA 278 October 2011) and below 350 μg/g (FOG, VDA 278 October 2011).

13 Claims, No Drawings

REDUCTION IN VOC AND FOG VALUES OF POLYPROPYLENE GRADES BY AERATION

FIELD OF INVENTION

The present invention relates to a process for obtaining polypropylene compositions with low volatile organic compound and low semi-volatile condensable substance contents determined as VOC content and FOG content according to VDA 278 October 2011 (VDA=Verband der Automobilindustrie).

BACKGROUND

Polyolefin polymers resulting from solution polymerisation often contain traces of the medium in which the polymerisation reaction has been carried out. Various options for the removal of volatile (VOC, VDA 278 October 2011) and semi-volatile organic condensables (FOG, VDA 278 October 2011) from polyolefin polymers are known. These include the use of solvents such as water, the use of vapour as well as the use of elevated temperature streams of gas in a process referred to as aeration or purging. Examples of general methods of aeration can be found in GB 1272778, WO 02/088194, WO2004/039848 and U.S. Pat. No. 6,218,504. These documents particularly relate to aeration or purging of polyethylene compositions.

The development of aeration processes is challenging as polyolefin polymers have an intrinsic stickiness and a tendency to agglomerate above a relatively low temperature. This results in a limited temperature window in which aeration can be carried out. Polyolefin polymers obtained from solution polymerisation processes often have a high content of volatiles (VOCs, VDA 278). In situations where it is also important to remove semi-volatile organic compounds (FOGs, VDA 278), often longer aeration times are required, as these molecules are by definition less volatile and harder to remove. However, in order to ensure that the polyolefin composition retains its desirable properties such as e.g. mechanical properties and scratch resistance it is important not to remove or strip out the additives required for producing a material with these properties.

Polyolefin compositions, such as e.g. polypropylene compositions, exhibiting a low level of emissions in standard tests like VDA 277 and VDA 278 can be roughly separated into two categories:

polyolefins deriving their low emission level from the polymerisation process, mostly from the nature of the catalyst, but also from the purity of the applied monomers and possibly from the selection of additives;

polyolefins and polyolefin compositions having undergone a post-purification step during or after compounding, possibly involving the use of specific substances like carrier liquids or absorbers.

As discussed in WO 2017/079246 for automotive applications, industry favours the reduction of vehicle weight by reducing the mass of plastic vehicle components. The reduction in the mass of plastic vehicle components is generally achieved by decreasing the wall thickness of the plastic parts. The production of thin-walled plastic parts, using for example injection moulding, requires that the constituent polymer resins have sufficiently low viscosity so that the molten resins can readily flow and uniformly fill mould cavities without excessive injection pressures. Decreasing the melt viscosity of a polymer resin requires decreasing the molecular weight of the constituent polymer molecules forming the resin. However, producing polymer resins containing lower molecular weight molecules increases the volatile organic compound (VOC, VDA 278 October 2011) and semi-volatile organic condensables (FOG, VDA 278 October 2011) content in the resin.

EP 2154190 notes that polypropylene is the material of choice for many applications. For instance, polypropylene materials are increasingly used for applications in automotive interiors, particularly because of their good processability and the fact that they can be individually customised. It is a requirement that these materials have low levels of odour particularly when used in HVAC (heating, venting, and air-conditioning) applications and in addition, low levels of volatiles, so that they do not cause fogging on the windscreen. This document concerns the use of 1,3,5-triazine derivative stabilizers for polypropylene compositions, which lead to reduced levels of FOG and VOC content. Such stabilizers are of course not desirable from the perspective of recycling.

U.S. Pat. No. 4,372,758 describes a degassing process for the removal of unpolymerized gaseous monomers from solid olefin polymers, in particular solid polymers in granular form. This document particularly relates to polyethylene copolymers and using nitrogen as the purging gas, or alternatively using gases with low oxygen concentration.

WO 2017/079246 describes polypropylene based resins characterized by a VOC content of less than 125 ppm and an FOG content of no greater than 500 ppm (according to VDA 278 October 2011), being achieved for an in-reaction polypropylene-based polymer resin without post polymerisation treatment of the resin.

EP 2262858 also specifies that reducing the emission of volatile components (VOCs) has been a general target for the automobile industry for several years. This document specifies polypropylene polymer compositions characterised by low emissions, high toughness and good scratch resistance. Exemplary levels of volatiles of less than 45 μgC/g (measured according to VDA 277) and an amount of VOCs (according to VDA 278) of less than 100 μg/hexadecane equivalents are given. These low levels of volatiles are achieved through the polymerisation process detailed in this document.

WO 2014/090856 specifically refers to the degassing of polyolefin particles in powder form with a stream of nitrogen, followed by pelletisation of the particles. However, this document does not mention any information about VOC content (VDA 278 October 2011) or FOG content (VDA 278 October 2011) of the product produced.

EP 3 126 408 relates to methods for the manufacture of polypropylene materials having target melt flow rates of from 10 to 200 g/min and of reducing FOG content to preferably about 250 μg/g or lower by maintaining the polymer composition at an elevated temperature for a sufficient period of time. This document merely speculates about using a gas stream for removing volatiles, but does not discuss aeration processes in the examples section. In addition, this document does not focus on reducing the VOC content in the polypropylene compositions.

Consequently, none of the documents above particularly relate to reducing the VOC content as well as the FOG content of polypropylene compositions using aeration techniques.

It is important to protect passengers from both unpleasant (or even toxic) volatile substances (VOC fraction) and from condensation of medium molecular weight oligomers or additives on the windscreen (FOG fraction). Consequently, low levels of both VOCs and FOGs are required for articles, which are used in automobile applications. Thus, there is interest from consumers, in the automobile industry and elsewhere, to develop economically acceptable aeration processes, which lead to a reduction in both VOCs and FOGs. Aeration processes are particularly desirable as they are post polymerization processes, which can be used to treat a range of polymers following polymerization.

The present invention is based on the finding, that such desirable low amounts of volatile and semi-volatile components (VOCs and FOGs) can be obtained by subjecting polypropylene compositions including a polypropylene homopolymer and/or a polypropylene random copolymer to an aeration step being characterized by a counter-current flow of polypropylene composition and aeration gas, relatively high aeration temperatures and relatively short aeration times.

The aeration process of the current invention also leads to economic advantages, as aeration for relatively short time periods requires less energy to supply heated gas. Additionally, less space is required for silos to house the polymer composition than for longer aeration processes, wherein larger amounts of the polymer composition must be stored for longer periods of time during the aeration process.

In addition, the aeration process of the current invention also has advantages in terms of maintaining the structural properties of the polypropylene and maintaining the scratch resistance of the polypropylene material while also leading to low levels of VOCs and FOGs. It is believed that aerating for extremely long periods of time with a low temperature gas, or using a gas with a temperature of greater than about 150° C., would lead to deterioration of the properties of the polypropylene material, for example deterioration of the scratch resistance properties of the polypropylene.

Furthermore, the process according to the present invention does not lead to a significant loss of "slip-agent" meaning that if the polypropylene composition is used for injection moulding to produce polypropylene articles, it is easily released from the mould and no polypropylene is left stuck to the mould surface. In other words, polypropylene compositions with such desirable low levels of VOCs and FOGs, while maintaining acceptable levels of slip agent such as e.g. erucamide in the composition, can be achieved.

SUMMARY OF THE INVENTION

The present invention insofar provides
a process for reducing the volatile organic compound (VOC) and semi-volatile organic condensable (FOG) content of a polypropylene composition to below 150 μg/g (VOC, VDA 278 October 2011) and below 350 μg/g (FOG, VDA 278 October 2011), the polypropylene composition including a polypropylene homopolymer and/or a polypropylene random copolymer, the process comprising the steps of
a) providing an aeration vessel having
at least one inlet for aeration gas,
at least one outlet for exhaust gas,
an inlet for a raw polypropylene composition at the top of the aeration vessel,
an outlet for the polypropylene composition at the bottom of the aeration vessel,
wherein the polypropylene composition is present as a packed bed;
b) initiating a counter-current flow of polypropylene composition and aeration gas
c) by
feeding the raw polypropylene composition having a volatile organic compound content (VOC, VDA 278 October 2011) of greater than about 150 μg/g and a semi-volatile organic condensable content of greater than about 350 μg/g (FOG, VDA 278 October 2011), into said aeration vessel from the top;
feeding the aeration gas into said aeration vessel via the at least one inlet at the bottom;
withdrawing the exhaust gas via the outlet for exhaust gas;
withdrawing the aerated polypropylene composition via the outlet at the bottom of the aeration vessel;
d) maintaining said aeration gas flow for an aeration time of from 3 to 96 hours,
wherein, the temperature of the gas is from 100° C. to 150° C., and wherein, the Reynolds number (Re) of the gas flow is from 5 to 150.

In certain embodiments, the present invention provides a process for reducing the volatile organic compound (VOC) and semi-volatile organic condensable (FOG) content of a polypropylene composition to below 80 μg/g (VOC, VDA 278 October 2011) and below 350 μg/g (FOG, VDA 278 October 2011), the polypropylene composition including a polypropylene homopolymer and/or a polypropylene random copolymer, the process comprising the steps of
a) providing an aeration vessel having
at least one inlet for aeration gas,
at least one outlet for exhaust gas,
an inlet for a raw polypropylene composition at the top of the aeration vessel,
an outlet for the polypropylene composition at the bottom of the aeration vessel,
wherein the polypropylene composition is present as a packed bed;
b) initiating a counter-current flow of polypropylene composition and aeration gas
c) by
feeding the raw polypropylene composition having a volatile organic compound content (VOC, VDA 278 October 2011) of greater than about 150 μg/g and a semi-volatile organic condensable content of greater than about 350 μg/g (FOG, VDA 278 October 2011), into said aeration vessel from the top,
feeding the aeration gas into said aeration vessel via the at least one inlet at the bottom;
withdrawing the exhaust gas via the outlet for exhaust gas;
withdrawing the aerated polypropylene composition via the outlet at the bottom of the aeration vessel;
d) maintaining said aeration gas flow for an aeration time of from 3 to 96 hours;
wherein, the temperature of the gas is from 100° C. to 150° C., and wherein, the Reynolds number of the gas flow is from 5 to 150.

In certain such embodiments, the temperature of the gas preferably is from 100° C. to 140° C. This preferred temperature may be combined with any of the preferred aspects described herein.

The present invention further provides a product obtainable by the processes as described above, as well as an article comprising said polypropylene composition, obtained as a result of the present invention. The article is preferably an automotive interior article such as a dashboard or a car door interior article.

The term "composition" may refer to both homopolymers and copolymers, which may optionally contain further components and/or additives.

The term "volatile organic compound content" or "VOC content" refers to the toluene equivalent content in a sample emission of material determined according to the Verband der Automobilindustrie recommendation VDA 278 October 2011. Volatile organic compound content is a measure of emissions from plastic materials such as low-density plastomers, which are caused by low-molecular components in the polymer material, generally alkanes with carbon chain lengths of up to about $C_{25}$. These low-molecular components can be residual monomers, oligomers, additives, plasticizers and/or degradation products.

The term semi-volatile organic condensables content (FOG content) refers to the n-hexadecane equivalent content in a sample emission of material determined according to the Verband der Automobilindustrie recommendation VDA 278 October 2011. Semi-volatile organic compound content is a measure of emissions from plastic materials, which are caused by medium molecular weight components, such as oligomers, which have a boiling point in the range of $C_{14}$-$C_{32}$ alkanes.

The term aeration or aeration process as used herein denotes a process or process step, in which a compound is subjected to a gas flow. This process is carried out in an aeration vessel.

The term aeration gas such as used herein denotes any gas suitable for being heated up to at least 50° C. and suitable for removing volatile organic compounds (VOCs) and semi-volatile organic condensables (FOGs) from polyolefin compositions. Suitable gases are, for example, nitrogen, or air, or mixtures thereof. However, in principle any inert gas may be used. For economic reasons, the most preferred gas for the process of the present invention is air.

The gas, which leaves the aeration vessel, i.e. the gas that took up the volatile organic compounds (VOCs) and semi-volatile organic condensables (FOGs), is denoted as the exhaust gas herein.

According to the current invention the Reynolds number (Re) for fluid (gas) flow through a packed bed, of particles having a median particle size D50, abbreviated as diameter D (m) in contact, where the superficial velocity is $v_s$ (m/s), is defined as:

$$Re = (\rho \cdot v_s \cdot D)/\mu$$

where:
- $\rho$: density of the aeration gas at the temperature used (kg/m³)
- $\mu$: kinematic viscosity of the aeration gas at the temperature used (kg/ms)
- $v_s$: superficial velocity, defined as Q/A where Q is the volume flow rate of the aeration gas, (m³/s) and A is the cross sectional area (m²)

As a matter of definition the diameter D (m) shall be the median particle diameter d50 (in meter) as obtained from a sieve analysis according to ISO3310 and determination of d50 according to ISO 9276-2.

Laminar conditions apply up to Re=10, fully turbulent from Re=2000.

The Reynolds number (Re) is an important dimensionless quantity in fluid mechanics used to help predict flow patterns in different fluid flow situations. It is used in the scaling of similar but different-sized flow situations, such as between an aircraft model in a wind tunnel and the full size version. The predictions of the onset of turbulence and the ability to calculate scaling effects can be used to help predict fluid behaviour on a larger scale.

In other words, the Reynolds number can be used to ensure that similar flow conditions are maintained when changing the scale (size) of the equipment where flow is taking place.

The term "pre-heating step" denotes a step generally preceding the treatment step or aeration step, in which the granular polymer composition is heated to the desired temperature for treatment. Pre-heating the granular polymer composition can facilitate the treatment process and reduce the time needed for the overall process. Furthermore, certain means of pre-heating can reduce the power consumption of the treatment process.

The term "top of the aeration vessel" refers to the upper 50% by volume of the aeration vessel, when in use and the outside surface thereof. Similarly, the term bottom of the aeration vessel refers to the lower 50% by volume of the aeration vessel, when in use and the outside surface thereof.

The term "total volumetric airflow" as used herein denotes the volume of gas flowing into the aeration vessel per hour referenced to the polypropylene composition weight flow.

The term "polypropylene composition weight flow" as used herein denotes the total weight of polypropylene composition flowing into the aeration vessel per hour (kg/h)

The term "pellets" as used herein denotes a polyolefin composition in the form of pellets and/or granulated material. Usually the pellets or granulated material will result from pelletizing or granulation. For example, pellets can be formed by forcing the polyolefin composition melt through a die and pelletizing it subsequently with an underwater granulator.

Pellets according to this invention may be oblong shaped, wherein the length of the pellet is greater than the width and height of the pellet.

Percentage reductions in VOC values (i.e. VOC content) according to the present invention is calculated as:

$$\text{Percentage reduction in } VOC \text{ values} = \left( \frac{VOC \text{ value before aeration} - VOC \text{ value after aeration}}{VOC \text{ value before aeration}} \right) \times 100$$

Percentage reduction in FOG values (i.e. FOG content) according to the present invention is calculated as:

$$\text{Percentage reduction in } FOG \text{ values} = \left( \frac{FOG \text{ value before aeration} - FOG \text{ value after aeration}}{FOG \text{ value before aeration}} \right) \times 100$$

Percentage reduction in TVOC, total carbon emissions (VDA 277) values according to the present invention is calculated as:

Percentage reduction in VDA 277 values (TVOC, total carbon emissions) =

$$\left( \frac{\text{VDA 277 value before aeration} - \text{VDA 277 value after aeration}}{\text{VDA 277 value before aeration}} \right) \times 100$$

Percentage reduction in fogging values according to the present invention is calculated as:

$$\text{Percentage reduction in fogging values} = \left( \frac{\text{fogging value before aeration} - \text{fogging value after aeration}}{\text{fogging value before aeration}} \right) \times 100$$

Percentage increase in the ratio of FOGs/VOCs according to the present invention is calculated as:

$$\text{Percentage increase in FOGs/VOCs} = \left( \frac{\frac{FOGs}{VOCs} \text{value after aeration} - \frac{FOGs}{VOCs} \text{value before aeration}}{\frac{FOGs}{VOCs} \text{value after aeration}} \right) \times 100$$

The present invention provides a process, wherein the Reynolds number of the gas flow is from 5 to 150, preferably from 10 to 100, most preferably from 15 to 50.

The present invention, preferably, provides a process, wherein the total volumetric airflow used is at least about 1 Nm³/kg, preferably at least about 1.5 Nm³/kg, more preferably at least about 2 Nm³/kg. The total volumetric airflow may be from 1 Nm³/kg to 5 Nm³/kg, preferably from 1.5 Nm³/kg to 4.5 Nm³/kg, more preferably from 2 Nm³/kg to 4 Nm³/kg.

The present invention preferably provides a process, wherein the aeration gas is air. Use of inert gases or gas mixtures consisting of air and inert gases may also be used. Such an embodiment is particularly preferred if the exhaust gas is recycled after a purification step. Air is the most preferred gas for use in aeration.

The process according to the present invention is preferably run as a continuous process. The present invention preferably provides a process according to the present invention, wherein the polypropylene composition weight flow through the aeration vessel is at least about 70 kg/h, preferably at least about 80 kg/h, more preferably at least about 85 kg/h, most preferably at least about 90 kg/h, referenced to an aeration vessel with a volume of 1.5 m³. The polypropylene composition weight flow may be from 70 to 200 kg/h, preferably from 80 to 190 kg/h, more preferably from 85 to 180 kg/h, most preferably from 90 to 170 kg/h referenced to an aeration vessel with a volume of 1.5 m³.

In the process according to the present invention, the raw polypropylene composition, which is flowed into the aeration vessel is preferably in pellet form. Preferred pellet diameters, more precisely median particle size d50 as determined according to ISO3310 and determined by ISO 9276-2 are from 2.5 and 4.5 mm, preferably 2.8 to 4.0 mm.

Pellets (or granules) often show a considerable gradient as to the amount of volatiles. As expected, in conventionally produced polypropylene composition pellets, the amount of volatiles (VOCs) and semi-volatiles (FOGs) is essentially zero close to the surface; whereas, it is considerably higher further from the surface of the pellet.

In the process according to the current invention, the pellets are optionally pre-heated before being added to the aeration vessel, such as being pre-heated to about 40° C. before being added to the aeration vessel.

The present invention optionally provides a process, wherein the raw polypropylene composition comprises a raw polypropylene polymer. The process according to the present invention is particularly suitable for demanding cases such as the raw polypropylene polymer originating from solution polymerization.

The present invention preferably provides a process, wherein the raw polypropylene composition contains at least one of the following components:
  an ethylene-propylene elastomer polymer
  an ethylene-α-olefin polymer
  filler(s)
  high density polyethylene (HDPE)
  nucleating agent(s)
  pigment(s)
  stabilizers; optionally not including 1,3,5 triazine derivative stabilizers.

In a preferred aspect of the present invention, the polypropylene composition after aeration has a ratio of FOGs/VOCs of above about 5. It is desirable to obtain polypropylene compositions with a specific ratio of FOGs/VOCs, above about 5; as this leads to compositions that do not emit undesirable substances, but which are scratch resistant and also exhibit acceptable release properties following injection moulding. Without wanting to be bound by any theory, it is believed that raw polypropylene compositions obtained directly after polymerization do not display this desirable ratio of FOGs/VOCs.

The present invention preferably provides an aeration process, which is operated for less than about 24 hours, or less than about 12 hours, or less than about 10 hours, such as from 3 to 9 hours.

The present invention preferably provides a process, wherein the temperature of the aeration gas is at least about 100° C., or at least about 110° C., or at least about 115° C. The temperature may be from about 100° C. to about 150° C., or from about 100° C. to about 140° C., or from about 110° C. to about 135° C., or from about 115° C. to about 130° C. The aeration temperature is most preferably about 120° C. It is believed that the process according to this invention when carried out at 120° C. leads to a polypropylene composition that maintains the scratch resistance exhibited prior to the aeration process. Moreover, it is believed that at these high temperatures most polymers would melt, or alternatively be too sticky to handle easily; consequently, the present process in combination with specific polymers provides advantages of efficiency of the process, while still ensuring that the polypropylene composition can be easily handled.

The present invention optionally provides a process in which the exhaust gas is subjected to a purification step and then recycled back to the inlet for the aeration gas.

The present invention optionally provides a process, wherein the exhaust gas passes a heat exchanger before being discharged into the atmosphere.

The present invention preferably provides a process, wherein the aeration vessel is a silo, preferentially an insulated silo. It should be understood that the use of an insulated silo is preferred for all embodiments described herein. The present invention preferably provides a process, wherein the aeration vessel is cylindrical, or a cylinder with a conical base.

In a preferred aspect, the process according to the present invention, leads to a composition wherein the puncture energy (ISO 6603-2) of the composition following aeration is within 10% of the puncture energy (ISO 6603-2) obtained for the raw composition prior to aeration.

DETAILED DESCRIPTION

It has surprisingly been found that the reduction in both VOCs and FOGs obtained by the inventive process are excellent for the given energy, effort and aeration time. In addition, there is no need for additional circulation of the granular composition.

Furthermore, the inventive process can be used at a commercial scale to reduce VOCs and FOGs to acceptable levels with relatively low effort. Consumers generally do not want polypropylene components in cars to emit fumes caused by VOCs or to cause fogging on the windscreen through the release of semi-volatile organic components (FOG).

In a first preferred embodiment of the present invention, the aeration time is from 3 to 96 hours, preferably from 3 to 5 hours and the temperature is from 115° C. to 135° C. This embodiment aims at reducing costs.

Insofar, the first preferred embodiment of the invention relates to a process for reducing the volatile organic compound (VOC) and semi-volatile organic condensable (FOG) content of a polypropylene composition to below 150 µg/g (VOC, VDA 278 October 2011) and below 350 µg/g (FOG, VDA 278 October 2011), the polypropylene composition including a polypropylene homopolymer and/or a polypropylene random copolymer, the process comprising the steps of
a) providing an aeration vessel having
   at least one inlet for aeration gas,
   at least one outlet for exhaust gas,
   an inlet for a raw polypropylene composition at the top of the aeration vessel,
   an outlet for the polypropylene composition at the bottom of the aeration vessel,
   wherein the polypropylene composition is present as a packed bed;
b) initiating a counter-current flow of polypropylene composition and aeration gas;
c) by
   feeding the raw polypropylene composition having a volatile organic compound content (VOC, VDA 278 October 2011) of greater than about 150 µg/g and a semi-volatile organic condensable content of greater than about 350 µg/g (FOG, VDA 278 October 2011), into said aeration vessel from the top,
   feeding the aeration gas into said aeration vessel via the at least one inlet at the bottom;
   withdrawing the exhaust gas via the outlet for exhaust gas;
   withdrawing the aerated polypropylene composition via the outlet at the bottom of the aeration vessel;
d) maintaining said aeration gas flow for an aeration time of from 3 to 96 hours,
   wherein, the temperature of the gas is from 115° C. to 135° C., and wherein, the Reynolds number of the gas flow is from 5 to 150.

In a second preferred embodiment, aeration is carried out at 138° C. to 146° C., for 6 to 9 hours, with a Reynolds number of the gas flow from 15 to 50. This embodiment aims to reduce the VOC content to 100 µg/g or less, preferably 60 µg/g or less, more preferably 40 µg/g or less, and most preferably 20 µg/g or less (VOC according to VDA 278 October 2011). Additionally, this embodiment aims to reduce the amount of FOG content to 300 µg/g or less, preferably 280 µg/g or less, more preferably 250 µg/g or less (FOG according to VDA 278 October 2011).

In a third particularly preferred embodiment, aeration is carried out at 115° C. to 125° C., for 3 to 5 hours, with a Reynolds number of the gas flow from 15 to 50.

The following ranges are applicable for all embodiments according to the invention.

Aeration Gas Flow

In the process according to the present invention, the pellets are preferably subject to a warm gas-stream.

The present invention preferably provides a process, wherein the Reynolds number of the gas flow is at least about 5, preferably at least about 10, most preferably at least about 15. It is believed, that a relatively fast flow of aeration gas is desirable to achieve the objectives of the current invention, and allows for a more even reduction of volatiles (VOC, VDA 278 October 2011) and semi-volatiles (FOG, VDA 278 October 2011) throughout the entire width of the pellets. Without wishing to be bound by any theory, it is believed that a minimum Reynolds number of 5 is required to bring enough heat into the aeration vessel in order to allow the aeration process to be successful.

The present invention preferably provides a process, wherein the total normalised volumetric airflow used is from 1 to 5 Nm$^3$/kg such as at least about 1.5 Nm$^3$/kg preferably at least about 2 Nm$^3$/kg such as around 2.6 Nm$^3$/kg.

According to the present invention, the gas input is at the bottom of the aeration vessel, resulting in a gas flow from the bottom to top through the bed of the polypropylene composition. In the present invention, the gas inlet may preferably be selected from the group of: a nozzle, a series of nozzles, a gas distribution ring and a gas distribution plate.

The process according to the present invention comprises a step of optionally subjecting the gas downstream of the aeration vessel to a means for removing the hydrocarbons. Preferably, these means are selected from one or more catalytic oxidation units, one or more carbon absorption columns (drums) and/or any conventional exhaust treatment known in the art. Even more preferably, these means are carbon absorption columns (drums). Preferably, when the aeration gas is air and/or nitrogen, it can be emitted into the atmosphere after removal of hydrocarbons. Additionally, the aeration gas can be treated and re-circulated back into the aeration vessel.

Moreover, the heat still contained in the discharged gas can be transferred to the gas used for aeration via heat exchangers known in the art, if the gas taken from the environment has a temperature lower than the temperature needed for the process.

In the process according to present invention, the exhaust gas is preferably discharged into the atmosphere. Alternatively, but less preferably the exhaust gas is used again after separation of the volatile and semi-volatile substances.

Aeration Process

The present invention preferably provides an aeration process, which is operated for less than about 24 hours, or less than about 12 hours, or less than about 10 hours, such as from 3 to 9 hours. Generally, the aeration time is inversely proportional to the gas temperature meaning that a compromise must be reached to avoid the pellets melting and sticking together. Typical values for the temperature and residence time for polypropylene according to EP2005/056962 are from 80 to 110° C. for a period of from 10 to 50 hours. It is believed that the reduction in VOC values reaches a plateau following extended aeration times of greater than five hours in the conditions described here; in contrast, for FOG values there is a weaker dependence on aeration time in the period from 0 to 5 hours. It is believed that this is due to slow diffusion of higher molecular weight alkanes ($C_{14}$-$C_{32}$), which contribute greatly to FOG values, in contrast to the rapid diffusion of ≤$C_{25}$ which are considered for VOC values.

In the process according to the present invention, the polypropylene composition is preferably not mixed or moved throughout the treatment by mechanical means. Consequently, during the aeration process the polypropylene composition is effectively stationary (apart from its vertical transit through the aeration vessel). Therefore, the present invention preferably excludes processes where the polymer composition is agitated during aeration; these processes do not fall under the scope of this invention, such as fluidised bed processes. Absence of mechanical mixing and similar measures such as re-filling or the like is particularly advantageous since the creation of fines is avoided. In addition, the filling degree is higher without the need for mechanical stirring or the need to transfer the polypropylene composition into another treatment vessel/silo.

The present invention optionally provides a process, wherein the pellets are pre-heated before being added to the aeration vessel, such as being pre-heated to at least 40° C., more preferably pre-heated to temperatures of from 80° C. to 100° C. before being added to the aeration vessel.

As the specific heat capacity of the polypropylene composition together with the mass of the polypropylene composition is significant compared to the specific heat capacity of the gas together with the mass of the gas, one has to be attentive that the gas stream temperatures are met for the inlet and the outlet of the aeration. Thus, if the polypropylene composition is provided at relatively low temperatures in a silo, a pre-heating step will be necessary. The pre-heating can also naturally be effected by the gas-stream and the temperatures as specified above. However, during such pre-heating the temperature at the outlet will be lower as the heat is transferred to the polypropylene composition.

The polypropylene composition is optionally pre-heated before the start of the aeration time to speed up the process. Generally, any heating measures known in the prior art can be used for pre-heating. The polypropylene composition may be pre-heated to temperatures of 40° C. or more, preferably 50° C. or more.

Pre-heating could also be considered as not letting the pellets cool down, which are produced, extruded and pelletized shortly beforehand. Such pellets normally have a temperature of about 40° C. or higher, preferably 50° C. or higher. Hence, the production process of the polypropylene composition and the process of the current invention can be carried out as an integrated process.

In contrast, the present invention may provide a process in which the polypropylene composition is not pre-heated before being added to the aeration vessel and in which the polypropylene is simply warmed by the flow of heated aeration gas in the silo. Without wishing to be bound by any theory, it is believed that with a relatively small pellet size (diameter of ca. 3.5 mm), the composition reaches the desired aeration temperature relatively rapidly after being added to the aeration vessel.

The aeration vessel used in the process of the present invention is not particularly limited and in principle, any commercially available aeration vessel or aeration silo may be used; in addition, customised aeration vessels, which have been specifically constructed for the purpose of aeration, may be used.

For shortening the pre-heating phase, avoiding energy loss during aeration and/or also increased homogeneity over the cross-section, the use of an isolated treatment vessel, preferentially an isolated silo is preferred. The silo may for example be a steel silo. Furthermore, the silo may be cylindrically or conically shaped.

Raw Polypropylene Composition

The present invention may provide a process, wherein the raw polypropylene composition comprises at least one filler selected from the group of natural or synthetic non-thermoplastic fillers or reinforcement, and/or at least one additive selected from the group of antioxidants, pigments, nucleating agents, and specific additives for enhancing UV stability and/or scratch resistance. Additives known to improve the scratch resistance of polypropylene compounds include erucamide, stearate and glycerol monostearate among others.

Polyolefins obtained from solution polymerization usually contain relatively high amounts of volatile and semi-volatile substances. The VOC value is, therefore, usually too high for end-use applications and the FOG value is also undesirably high (VOC and FOG according to VDA 278 October 2011). It is self-explanatory, that polypropylene compositions having other process histories may also be treated. However, usually such raw plastomers do not show undesirably high values of VOC or FOG. Polymerisation processes by their nature result in relatively high amounts of low molecular by-products. Consequently, the inventive process does not require the use of highly pure reactants and in fact, it is possible to add value to relatively impure raw polypropylene compositions.

Preferably, the raw polypropylene composition used in process of the present invention shows a VOC value of 150 µg/g or more, or 180 µg/g or more, or 200 µg/g or more. Additionally, the raw polypropylene composition used in process of the present invention may show an FOG value of 350 µg/g or more, or 400 µg/g or more (VOC and FOG according to VDA 278 October 2011).

The raw polypropylene composition used in process of the present invention may have a ratio of FOG/VOC of 5 or less, preferably 3 or less, such as between about 3 and about 2.

Preferably, the raw polypropylene composition used in process of the present invention has a total carbon emission value (TVOC) of greater than 20 µgC/g, preferably greater than 30 µgC/g, more preferably greater than 40 µgC/g (according to VDA 277 January 1995). Additionally, the raw polypropylene composition may have a fogging gravimetric, measured according to DIN 75201:2011-11, of greater than 1.2.

The raw polypropylene polymer used in the process of the present invention may comprise a crystalline polypropylene homopolymer or random copolymer component. The crystalline polypropylene homopolymer or random copolymer component may have a melting point ($T_m$) of greater than 150° C., preferably greater than 160° C. Following aeration there is negligible change in the melting point ($T_m$) of the polypropylene composition, such as e.g. a less than 10% reduction in melting point ($T_m$) value, or a less than 5% reduction in melting point value, or a less than 2.5% reduction in melting point value. The melting point ($T_m$) of the composition following aeration is, therefore, usually greater than 150° C., preferably greater than 160° C.

The crystalline polypropylene homopolymer or random polypropylene copolymer component may have an $MFR_2$ (230° C.) of 4 to 160 g/10 min, preferably 5 to 100 g/10 min and the xylene soluble fraction an $MFR_2$ (230° C.) from 10 to 40 g/10 min prior to aeration. The polypropylene composition prior to aeration optionally has a melting point ($T_m$) of from 140° C. to 170° C. Following aeration the polypropylene composition optionally has a melting point ($T_m$) of from 150° C. to 169° C. Without wishing to be bound by any theory, it is believed that the aeration process according to the present invention does not lead to a substantial change in the properties of the polypropylene compositions, such as e.g. $T_m$.

Properties of the Polypropylene Composition Post Aeration

The polypropylene compositions which result from the inventive process show FOG values of 350 µg/g or less, preferably 300 µg/g or less, more preferably 250 µg/g or less, more preferably 200 µg/g or less, most preferably 170 µg/g or less. In addition, the polypropylene compositions that result from the inventive process may show VOC values of 150 µg/g or less, or of 80 µg/g or less, or of 60 µg/g or less, preferably of 40 µg/g or less, most preferably of 20 µg/g or less. (Both VOC and FOG values according to VDA 278 October 2011)

Preferably, the inventive process leads to polypropylene compositions with a ratio of FOG/VOC of 3 or more, preferably 5 or more, more preferably 10 or more, more preferably 13 or more (both, VOC and FOG values according to VDA 278 October 2011).

The process according to the present invention may lead to polypropylene compositions with a total carbon emission value of up to 10 µgC/g, such as less than 10 µgC/g, preferably less than 5 µgC/g, more preferably less than 2 µgC/g, most preferably less than 1 µgC/g (total carbon emission, TVOC according VDA 277 January 1995). In addition, the process may lead to polypropylene compositions with a fogging gravimetric of less than 1.2, preferably less than 1.1, most preferably less than 1.

In certain embodiments, the inventive process leads to a reduction in VOC values (VDA 278 October 2011) of the polypropylene composition of greater than 70%, preferably greater than 80%, more preferably of greater than 90%.

In certain embodiments, the inventive process leads to a reduction in FOG values (VDA 278 October 2011) of the polypropylene composition of greater than 20%, preferably greater than 30%, more preferably greater than 40%, most preferably greater than 60%. In certain embodiments, the inventive process leads to a reduction in total carbon emissions, TVOC (VDA 277, January 1995) values of the polypropylene composition of greater than 70%, preferably greater than 80%, more preferably of greater than 90%.

In certain embodiments, the inventive process leads to a reduction in Fogging gravimetric values of the polypropylene composition of greater than 5%, or greater than 10%, or greater than 50%.

In certain such embodiments, the inventive process leads to a reduction in VOC values (VDA 278 October 2011) of the polypropylene composition of greater than 70%, and a reduction in FOG values (VDA 278 October 2011) of greater than 20%, and a reduction in VDA 277 (January 1995) values of greater than 70%.

The present invention, furthermore, relates to a process for the reduction in VDA 277 (January 1995) values of polypropylene compositions and to a process for the reduction of fogging gravimetric of polypropylene compositions. The present invention preferably provides a process, wherein the polypropylene composition after aeration has a VOC of below 80 µg/g (VOC, VDA 278 October 2011) and an FOG value of below 350 µg/g (FOG, VDA 278 October 2011) and has a ratio of FOG/VOC of more than 5.0.

The puncture energy (ISO 6603-2) of the composition according to the present invention following aeration is within 10% of the puncture energy of the raw composition, preferably within 5%, more preferably within 2.5%. This demonstrates that the polypropylene composition does not lose the ability to withstand a point impact following aeration and as such can be seen as confirmation that the present invention does not lead to a reduction in the mechanical properties of the polypropylene material.

Surprisingly, the process according to the present invention does not lead to depletion of "slip agents" such as e.g. erucamide. During polypropylene production, slip agents are often added to the polypropylene blend in order to reduce the coefficient of friction of these polypropylene materials. The most popular slip agents used by industry are from the chemical group of fatty amides, such as e.g. erucamide. When a slip agent is mixed with a polypropylene polymer melt, it is absorbed into the amorphous regions of the polypropylene polymer.

On cooling the slip agent becomes incompatible with the polypropylene material because of the different surface energies of the two materials and migrates to the material surface. The rate of migration depends on the difference between the surface energies of the polypropylene and the slip agent (the larger the difference, the faster the migration). This initially leads to the formation of a monolayer on the polymer surface, followed by the deposition of subsequent layers when new molecules of the slip agent arrive on the surface leading to the formation of a double layer. Because of weak bonding between the layers of fatty amides, materials produced from polypropylene containing fatty amides will slide over each other with ease. The presence of a layer of slip agent also reduces the friction at the surface of the polypropylene composition. This property is also important, for example, when producing injection-moulded articles, as slip agents can be used to help aid the release of injection-moulded articles from a mould. Fatty amides come to the surface of polypropylene articles, when the polypropylene cools; therefore, reducing the coefficient of friction between the polypropylene article and the mould. This means that with relatively little force the polypropylene article can be removed from the mould and that no polypropylene sticks to the mould on release of the moulded article. Many slip agents in particular fatty amides, such as e.g. erucamide are relatively volatile and, therefore, care is required to prevent these materials escaping during processing steps in polymer production. The process according to the current invention does not lead to depletion of slip agents in particular fatty amides, such as e.g. erucamide. Therefore, the process according to the present invention allows the advantageous removal of volatile and semi-volatile substances, without stripping out slip agents from the polypropylene composition. Thus, in the process according to the present invention, the polypropylene composition preferably contains at least one slip agent, more preferably at least one slip agent selected from the group of fatty amides, most preferably erucamide.

Process

As mentioned above, the present invention is concerned with a process for producing polypropylene compositions showing:

an FOG value of below 350 μg/g and a VOC value of below 150 μg/g;

the process comprising the steps of
- a) polymerizing propylene and optionally other $C_4$-$C_{12}$ alpha olefins by solution polymerisation in at least one polymerization reaction to yield a raw polypropylene polymer;
- b) recovering said raw polymer from the at least one polymerisation reactor and feeding said raw polymer mixture to at least one flash vessel thereby at least partially removing solvent, unreacted monomer and unreacted co-monomer to yield a raw polymer;
- c) mixing the polymer with a range of other components, optionally including HDPE, fillers, carbon nanoparticles among others and subjecting the raw composition to mixing, preferably by an extruder or a static mixer;
- d) recovering the raw polypropylene composition showing
  - a VOC value of above 150 μg/g and
  - a FOG value of above 350 μg/g
- e) subjecting said raw polypropylene composition in an aeration vessel to a gas stream with a Reynolds number (Re) of from 5 to 150 for an aeration time from 3 to 96 hours, wherein the gas has a temperature of from about 100° C. to about 150° C.,
- f) recovering the polypropylene composition.

Product

An aspect of the present invention also relates to products obtainable by the processes described above and to articles produced therewith. Polypropylene is a versatile material that is easily processable and which finds a number of applications in the automobile industry e.g. for injection moulded components such as, e.g., dashboards or car door interior articles. Polypropylene compositions are also used as the covering for blister packaging.

All preferred ranges and embodiments as described above also hold for this integrated process and are incorporated by reference herewith.

Experimental Part

The following examples are included to demonstrate certain aspects and embodiments of the invention as described in the claims. It should be appreciated by those of skill in the art, however, that the following description is illustrative only and should not be taken in any way as a restriction of the invention.

Test Methods

Sample Preparation

VOC values, FOG values and TVOC (total carbon emission) values were measured as described below, after sample preparation consisting of injection moulding plaques in the according to EN ISO 19069-2:2016. These plaques were packed in aluminium-composite foils immediately after production and the foils were sealed.

For the thermodesorption analysis according to VDA 278 (October 2011) the samples were stored uncovered at room temperature (23° C. max.) for 7 days directly before the commencement of the analysis.

Regarding the VDA 277 (January 1995) measurements, no additional uncovered storage or other conditioning took place. Instead, the injection-moulded plaques were cut and ground in a Retsch SM-2000 mill.

In both cases (VDA 277 and VDA 278), the production date of the injection moulded plaques, the time when the sample arrived in the lab as well as the analysis date were recorded.

VOC and FOC acc. VDA278

VOC value is determined according to VDA 278 October 2011 from injection moulded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-pentacosane ($C_{25}$) to be determined and analyzed."

FOG value is determined according to VDA 278 October 2011 from injection moulded plaques. According to the VDA 278 October 2011 the FOG value is defined as "the total of substances with low volatility, which elute from the retention time of n-tetradecane (inclusive)". It is calculated as hexadecane equivalent. Substances in the boiling range of n-alkanes "$C_{14}$" to "$C_{32}$" are determined and analysed.

Total Carbon Emission, TVOC:

The total carbon emission of the polypropylene composition was determined by VDA 277 (January 1995) from pellets, where VDA 277 is referred to in the application the total carbon emission is what is meant.

Fogging:

Fogging was measured according to DIN 75201:2011-11, method B (gravimetric method) on compression-moulded specimens (diameter 80 mm+/−1 mm, thickness<1 cm) cut out from an injection-moulded plate. With this method, the mass of fogging condensate on aluminium foil in mg is determined by means of weighing of the foil before and after the fogging test. The term "fogging" refers to a fraction of volatile substances condensed on glass parts as e.g. the windscreen of a vehicle.

Melt Flow Rate ($MFR_2$):

The melt flow rates were measured with a load of 2.16 kg ($MFR_2$) at 230° C. The melt flow rate is the quantity of polymer in grams, which the test apparatus standardized to ISO 1133 extrudes within 10 minutes at a temperature of 230° C. under a load of 2.16 kg.

Xylene Cold Soluble Fraction (XCS wt %):

The xylene cold soluble fraction (XCS) is determined at 23° C. according to ISO 6427.

Polymer-Puncture Plaque—Instrumented:

Puncture energy is determined in the instrumented falling weight test according to ISO 6603-2 using injection moulded plaques of 60×60×1 mm and a test speed of 2.2 m/s, clamped, lubricated striker with 20 mm diameter. The reported puncture energy results from an integral of the failure energy curve measured at (60×60×1 mm).

Diameter D

A sieve analysis according to ISO 3310 was performed. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm, >4 mm. The samples were poured into the top sieve, which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 was determined from the results of the sieve analysis according to ISO 9276-2.

EXPERIMENTS

TABLE 1

Properties of the base resins used in the compositions used in Example 1.

| Base resin | Type | MFR$_2$ (g/10 min) | Xylene solubles (wt-%) | C2 (ethylene content) (wt-%)[2] |
|---|---|---|---|---|
| Resin 1 | Heterophasic polypropylene copolymer | 100 | 13 | 6.5 |
| Resin 2 | RTPO[1] | 5.5 | 25 | 6.5 |
| Resin 3 | RTPO[1] | 18 | 31 | 20 |
| Resin 4 | Heterophasic polypropylene copolymer | 20 | 18 | 8 |

[1]Reactor-made polyolefin
[2]Determined by $^{13}$C-NMR spectroscopy

TABLE 2

The composition of each of the polypropylene compositions (A, B and C) used in Example 1

|  |  | A | B | C |
|---|---|---|---|---|
| Base resin | Resin 1 | 46.0 | 29.5 |  |
|  | Resin 2 | 21.0 | 15.0 | 10.0 |
|  | Resin 3 |  | 19.5 | 40.5 |
|  | Resin 4 |  |  | 25.0 |
|  | HDPE | 6.0 | 8.0 | 8.0 |
|  | Elastomer[1] | 7.0 | 4.0 |  |
| Filler | Talc filler | 10.0 | 17.0 | 7.0 |
|  | Carbon black/other carbon | 7.5 | 4.5 | 6.0 |
|  | Total | 97.5 | 97.5 | 96.0 |
| Propepties[2] |  |  |  |  |
|  | Tm (° C.) | 165 | 166 | 166 |
|  | MFR (g/10 min) | 20 | 17 | 13 |
|  | Puncture energy 23° C., 4.4 m/s, 3 mm (J) | 42 | 39 | 39 |
|  | Flexural modulus (MPa) | 1700 | 1800 | 1400 |

Values are given in weight percent and rounded to the nearest 0.5 %.
[1]An ethylene-propylene elastomer.
[2]Properties of the raw polypropylene compositions before aeration.

Example 1 (Ex1)

Batches of pelletized polypropylene compositions, corresponding to the materials A, B and C as defined in Table 2 respectively, were subjected to aeration. Aeration was carried out in an insulated cylindrically shaped silo with dimensions of 1.5 m$^3$. The pellets had a median particle size d50 of 3.5 mm (ISO 3310, evaluation according to ISO 9276-2).

The pellets were at room temperature (ca. 25° C.) before being subject to aeration i.e. a pre-heating step was not applied.

The aeration process was carried out for 7.5 hours at a temperature of 140° C. A gas flow rate of 260 m$^3$/h was used. The pellets were not mixed or agitated during the process and instead simply moved vertically through the silo at a speed of 100 kg/h. This corresponds to a normalised gas flow of 2.6 Nm$^3$/kg.

$$\text{Normalised gas flow} = \frac{\text{Gas flow rate}}{\text{Pellet speed}} = \frac{260}{100} = 2.6.$$

The process was carried out on a 1000 kg scale. In a cylindrical silo of 1.5 m$^3$. A relative flow rate of polypropylene composition pellets of 100 kg/h was maintained throughout the aeration process.

The aeration process was carried out continuously for about 7.5 hours.

The VOC, FOG, VDA 277 and Fogging gravimetric obtained for each grade before and after the aeration step is given in Table 4.

TABLE 3

Summary of the airflow characteristics used in the present experiments

|  | Units | Value in the current experiments (with air) |
|---|---|---|
| density of the fluid (gas)/ | Kg/m$^3$ | 0.85 |
| kinematic viscosity of the fluid (gas)/μ* | kg/m · s | 2.35 × 10$^{-5}$ |
| superficial velocity/ $v_s$ | m/s | 0.16 |
| Diameter of the particles/D (determined using method as described above) | m | 0.0035 |

*Density and kinematic viscosity of the fluid gas (in the example: air of the given temperature) can simply be looked up for any temperature of interest in textbook tables.

Superficial velocity is calculated by dividing the volumetric airflow (i.e. m$^3$/h) by the cross sectional area of the apparatus (m$^2$); for the volumetric airflow, the actual flow must be used in m$^3$/h.

The Reynolds number can be calculated using the formula:

$$Re = (\rho \cdot v_s \cdot D)/\mu$$

where:

ρ: density of the aeration gas at the temperature used (kg/m$^3$)

μ: kinematic viscosity of the aeration gas at the temperature used (kg/ms)

$v_s$: superficial velocity, defined as Q/A where Q is the volume flow rate of the aeration gas, (m$^3$/s) and A is the cross sectional area (m$^2$)

D: d50 diameter (m) of the particles (using sieve analysis according to ISO3310 and evaluation according to ISO9276-2)

$$Re = (\rho \cdot v_s \cdot D)/\mu$$

The Reynolds number for the gas flow used in the process of example 1 was 20.

TABLE 4

Summary of VOC, FOG, VDA 277 and Fogging gravimetric for polymers A, B and C before and after aeration.

| Polymer Units | | V0A278, VOC* μg/g | V0A278, FOG* μg/g | V0A277, TVOC** μgC/g | Fogging gravimetric wt.-% | FOG/VOC |
|---|---|---|---|---|---|---|
| A | Before aeration | 232 | 460 | 45 | 1.28 | 2 |
|   | After aeration | 12 | 161 | 1 | 0.52 | 13 |
| B | Before aeration | 188 | 400 | 41 | 1.26 | 2 |
|   | After aeration | 16 | 235 | <1 | 1.08 | 15 |
| C | Before aeration | 245 | 464 | 45 | 0.85 | 2 |
|   | After aeration | 14 | 150 | <1 | 0.32 | 11 |

Test conditions: 140° C. 7.5 h, Pellet flow: 100 kg/h, vol. airflow: 260 m³/h. VOC and FOG values were measured after 7 days of uncovered storage according to VDA 278, VDA 277 and fogging gravimetric were measured immediately
**total carbon emissions

TABLE 5

Properties of polypropylene compositions A, B and C following aeration

| Polymer | Melting point, Tm (° C.) | Puncture energy 23° C., 4.4 m/s, 3 mm (J) | Percentage change in puncture energy before and after aeration (%) |
|---|---|---|---|
| A | 165 | 42 | 0 |
| B | 166 | 40 | 2.5 |
| C | 166 | 39 | 0 |

The invention claimed is:

1. A process for reducing the volatile and semi-volatile organic compounds (VOC and FOG values) of a polypropylene composition to below 20 μg/g (VOC, VDA 278 October 2011) and below 250 μg/g (FOG, VDA 278 October 2011), the polypropylene composition including a polypropylene homopolymer and/or a polypropylene random copolymer,
the process comprising the steps of:
a) providing an aeration vessel having:
at least one inlet for aeration gas,
at least one outlet for exhaust gas,
an inlet for a raw polypropylene composition at the top of the aeration vessel,
an outlet for the polypropylene composition at the bottom of the aeration vessel;
wherein the polypropylene composition is present as a packed bed;
b) initiating a counter-current flow of the polypropylene composition and aeration gas, wherein the aeration gas is nitrogen or air or mixtures thereof;
c) by
feeding particles of the raw polypropylene composition showing a VOC value of greater than about 150 μg/g and an FOG value of greater than about 350 μg/g (VOC and FOG values according to VDA 278 October 2011), into said aeration vessel from the top, the polypropylene homopolymer and/or the polypropylene random copolymer having a melting point (Tm) of greater than 150° C., a melt flow rate MFR$_2$ (230° C.) of 4 to 160 g/10 min, and a xylene soluble fraction having a melt flow rate MFR$_2$ from 10 to 40 g/10 min prior to aeration, wherein the particles of the raw polypropylene composition are in pellet form and the pellets have a diameter D in the range of from 2.8 to 4.0 mm, wherein a polypropylene composition weight flow through the aeration vessel is from 70 to 170 kg/h referenced to an aeration vessel with a volume of 1.5 m³;
feeding the aeration gas into said aeration vessel via the at least one inlet at the bottom, wherein a total volumetric airflow used is from 2 Nm³/kg to 4 Nm³/kg, the total volumetric airflow being the volume of gas flowing into the aeration vessel per hour referenced to the polypropylene composition weight flow;
withdrawing the exhaust gas via the outlet for exhaust gas;
withdrawing the aerated polypropylene composition via the outlet at the bottom of the aeration vessel;
d) maintaining said aeration gas flow for an aeration time of from 3 to 9 hours,
wherein, the temperature of the aeration gas is from 100° C. to 150° C., and wherein a Reynolds number (Re) of the gas flow is from 15 to 50, wherein the Reynolds number for the flow of aeration gas through the packed bed is defined by formula (I):

$$Re = (\rho \cdot v_s \cdot D)/\mu \qquad (I)$$

where:
ρ is the density of the aeration gas at the temperature used (kg/m³),
μ is the kinematic viscosity of the aeration gas at the temperature used (kg/m s),
$v_s$ is the superficial velocity, defined as Q/A where Q is the volume flow rate of the aeration gas, (m³/s) and A is a cross sectional area (m²) of the aeration vessel, and
D is a diameter (m) of the particles,
wherein the polypropylene composition is not agitated during aeration and the aeration is not a fluidized bed process.

2. The process according to claim 1, wherein the aeration gas is air.

3. The process according to claim 1, wherein the process is continuous.

4. The process according to claim 1, wherein the pellets are pre-heated before being added to the aeration vessel.

5. The process according to claim 1, wherein at least one component of the raw polypropylene composition originates from a solution polymerisation process.

6. The process according to claim 1, wherein the polypropylene composition after aeration has a ratio of FOG/VOC of more than 5.0.

7. The process according to claim 1, wherein the temperature of the aeration gas is from 100° C. to 140° C.

8. The process according to claim 1, wherein the exhaust gas is subjected to a purification step and then recycled back into the inlet for the aeration gas.

9. The process according to claim 1, wherein the exhaust gas passes a heat exchanger before being discharged into the atmosphere.

10. The process according to claim 1, wherein the aeration vessel is cylindrical, or conical, or cylindrical with a cone shaped bottom portion.

11. The process according to claim 1, wherein the polypropylene composition contains at least one slip agent.

12. A product obtainable by the process according to claim 1.

13. The process according to claim 1, wherein the polypropylene composition weight flow through the aeration vessel is from 70 to 100 kg/h referenced to an aeration vessel with a volume of 1.5 m$^3$.

* * * * *